Oct. 24, 1933.   E. F. CONLEY   1,931,815
PNEUMATIC LIFT
Filed March 31, 1932   2 Sheets-Sheet 2
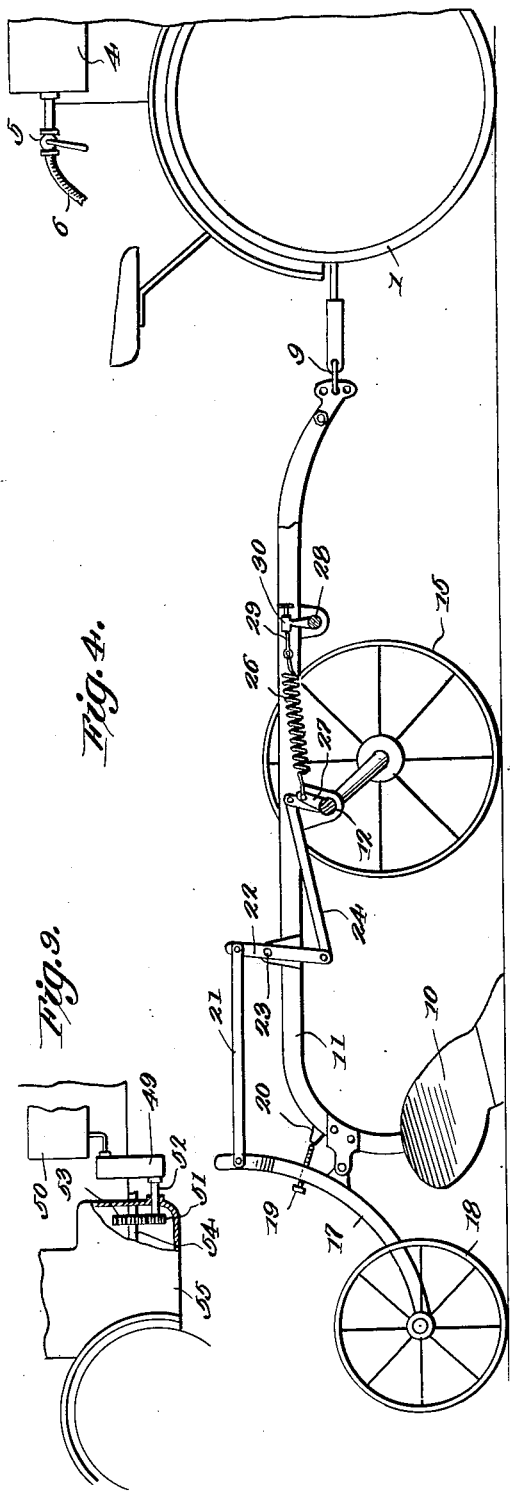
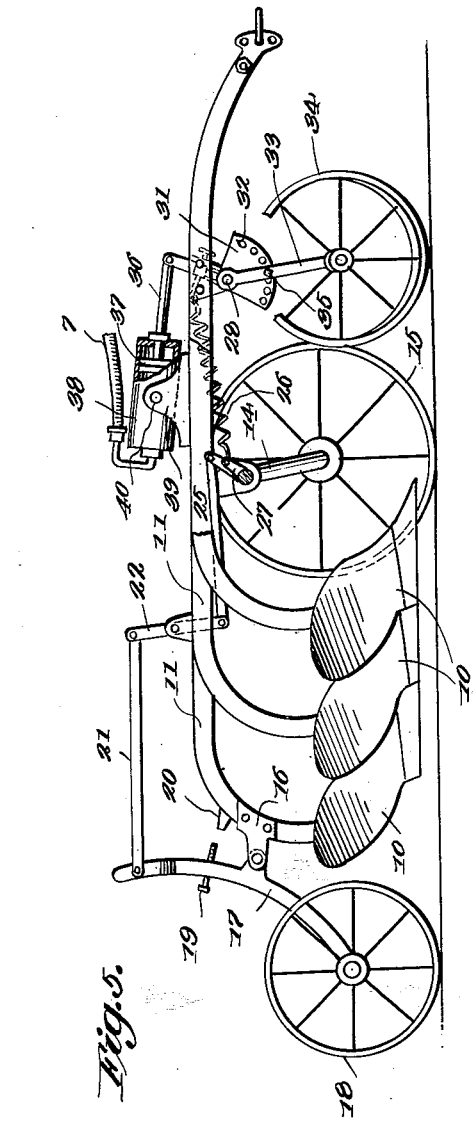
Inventor
EARLE F. CONLEY Patented Oct. 24, 1933

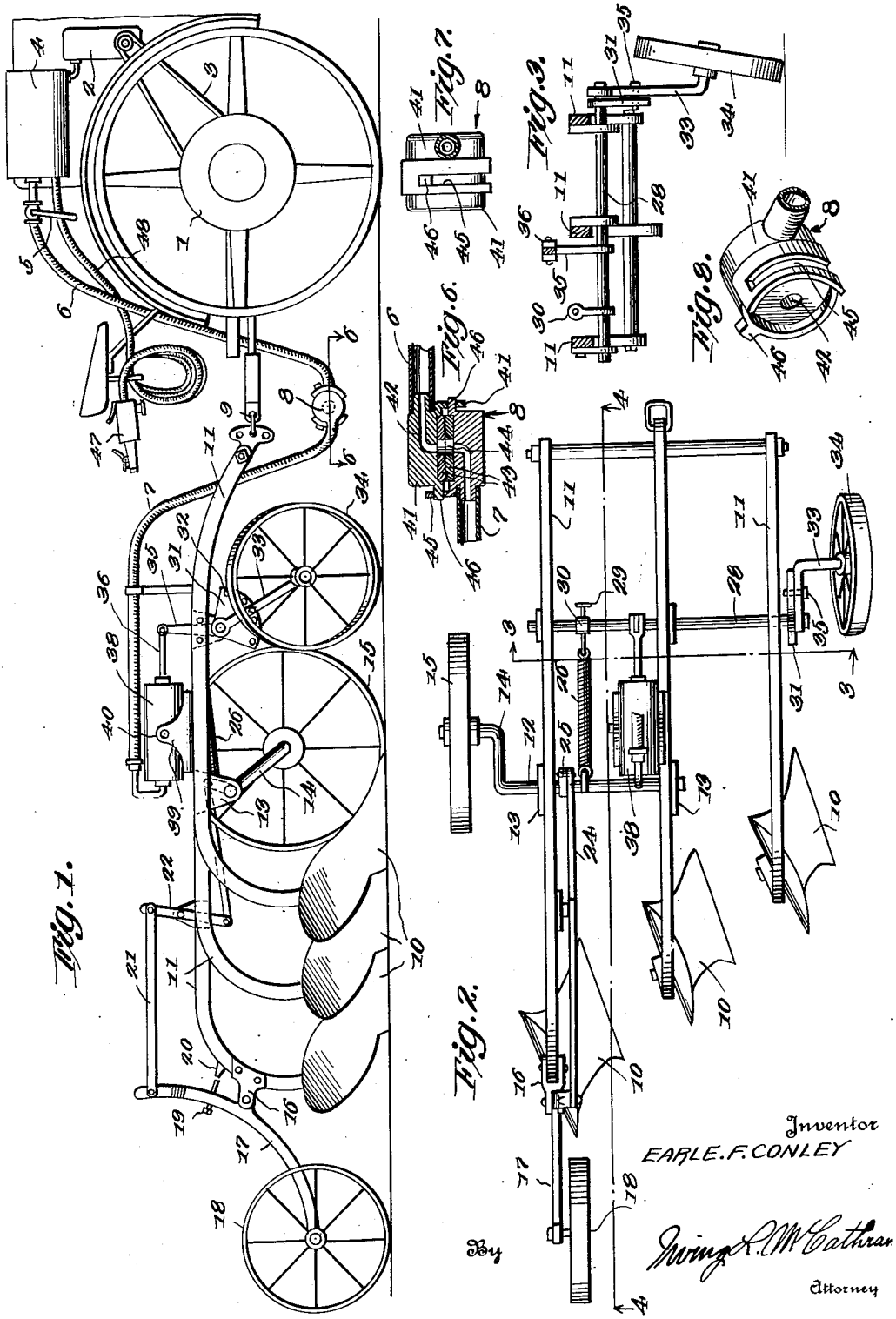

1,931,815

UNITED STATES PATENT OFFICE 1,931,815

PNEUMATIC LIFT

Earle F. Conley, Spiritwood, N. Dak.

Application March 31, 1932. Serial No. 602,352

4 Claims. (Cl. 97—50)

This invention relates to an air lift appliance for plows and other agricultural machines, wherein such a lift appliance is of advantage.

Another object of my invention is the production of a simple and efficient lifting mechanism which may be properly adjusted to raise the plow or agricultural implement the desired height at the will of the operator.

A still further object of this invention is the production of a simple and efficient means for mounting the gripping wheel upon or in conjunction with the plow beam or frame of the agricultural machine.

With these and other objects in view, the invention consists in certain novel constructions, combinations, and arrangements of parts as will be hereinafter more fully described and claimed.

In the drawings:—

Figure 1 is a side elevation of the device shown attached to the rear portion of a tractor or other propelling means;

Figure 2 is a top plan view of the structure;

Figure 3 is a section taken on line 3—3 of Figure 2 looking in the direction of the arrow;

Figure 4 is a longitudinal sectional view taken on line 4—4 of Figure 2;

Figure 5 is a side elevation of the lifting mechanism showing the plows lifted or in a raised position;

Figure 6 is a section taken on line 6—6 of Figure 1;

Figure 7 is an end elevation of the hose coupling showing the connecting hose in section;

Figure 8 is a detail perspective view of one of the coupling heads; and

Figure 9 is an end elevation partly in section of the motor showing the manner of driving the pump from the timing gear shaft.

By referring to the drawings it will be seen that 1 designates the tractor which may be of any suitable or desired construction, upon which is mounted a compressor 2, driven through the medium of a belt or chain 3. This compressor 2 is connected to a storage tank 4, which storage tank 4 carries a control valve 5. This valve 5 carries a supply hose 6 which is connected to the supply hose 7 carried by the gang plow, the hose 6 and 7 being connected by means of a suitable coupling 8.

The forward ends of the plow beams are connected in any suitable or desired manner to the connection 9 carried by the tractor and a series of plows 10 are supported by the plow beams 11 which are preferably arranged in spaced parallel relation, as is the custom with the structures of this character.

A land wheel supporting axle 12 is carried in any suitable or desired manner by the plow beams 11 and is preferably hung upon the hangers 13, the axle 12 being rotatable within the hangers 13. The axle 12 is provided with a crank extension 14, upon which the land wheel is mounted and by rotation of the axle 12, it will be seen that the land wheel 15 may be raised and lowered, depending upon the direction in which the axle 12 is rotated.

As shown in the drawings, the plow beams 11 are preferably graduated in length, the inner left hand beam being preferably longer than the other beam and to this inner left hand beam is secured a journal plate 16 upon which journal plate 16 is pivotally secured the trailer wheel supporting arm 17. The trailer wheel supporting arm 17 is preferably bowed rearwardly and the rear end of the trailer wheel supporting arm 17 carries a trailer wheel which is adapted to contact with the ground. The trailer wheel supporting arm 17 carries a threaded bolt 19 which may be adjusted through the arm 17 to contact with the lug 20 formed upon the left hand beam 11 so as to limit the upward swing of the arm 17. The forwardly extending link 21 is pivotally connected to a vertically extending crank arm or lever 22, which is pivoted at 23 on the left hand plow beam 11. The lower end of the arm 22 is pivotally connected to a forwardly extending link 24, which link 24 is pivotally connected to a vertically extending finger 25 carried by the transversely extending land wheel supporting axle 12. The land wheel 15 is normally urged into engagement with the ground through the medium of a tension coil spring 26, which is connected to the axle 12 through the medium of the upwardly extending finger 27, the forward end of the spring 26 being connected to the forward furrow wheel supporting axle 28, through the medium of the adjusting screw 29, which passes through the support 30.

The furrow wheel supporting shaft 28 is hung under the plow beams 11 as shown clearly in Figures 2 and 5 and the outer end of the furrow wheel supporting shaft or axle 28 carries a segmental plate 31 which is provided with a plurality of closely arranged apertures 32 near the periphery of the segmental plate 31. The axle or shaft 28 has pivoted thereon a wheel supporting arm 33, which engages the furrow wheel 34. This arm 33 carries a threaded pin 35 which may be threaded into one of the apertures 32 for the purpose of changing the angle of the arm 33 and anchoring the same in a set position with respect to the segmental plate 31, and adjusting the normal height of the forward ends of the beams 11 with respect to the furrow wheel 34. The furrow wheel supporting shaft or axle 28 is provided with an upwardly extending arm 35, which arm 35 is connected to a piston rod 36 carrying a piston 37 which works within the cylinder 38.

The cylinder 38 is carried by a bracket plate 39, which bracket plate is preferably mounted upon the plow beam 11, the cylinder 38 being so mounted as to swing slightly upon its bearings 40. This will compensate for the relative swing or arch of the arm 35 as the shaft or axle 28 is rotated. The hose 7 is connected at one end of the cylinder 38, preferably at the rear end or opposite to the piston head 37. The exhaust of the air may be controlled through the medium of the valve 5 to release pressure from the cylinder 38 when it is so desired.

As shown in Figure 1, the cylinder 38 is connected to a hose 7 and the reservoir tank 4 is connected to a hose 6. These sections of the hose 6 and 7 each carry a coupling head 41, the coupling heads being similarly constructed and having communicating passageways 42 which form a communication between the hose 6 and the hose 7 when the coupling heads 41 are connected. Each coupling head carries an abutting washer 43, the washers 43 being apertured as at 44. Each coupling head 41 is provided with a slotted flange 45 for receiving a laterally extending lug 46 of the companion coupling head to facilitate the holding of the coupling heads in interlocker relation. The rubber washers 43 are adapted to constitute an efficient means for producing an air-tight connection through the co-operation of the lugs 46 fitting in the slotted flanges 45. This structure will permit the coupling to be readily disengaged when desired.

As shown in Figure 1, a pressure greasing nozzle 47 may be connected to a pressure line 48 and carried and supported in any suitable or desired manner.

As shown in Figure 9, a modified structure is illustrated for actuating the pump 49 for replenishing the air tank 50 and this pump 49 is driven by a pinion 51 carried by a shaft 52 and this pinion 51 meshes with a pinion or gear 53 carried by the timing gear shaft 54 of the motor 55.

By careful consideration of the drawings it will be seen that the operation of the device is as follows:—

The operator may actuate the valve 5 thereby causing air pressure to pass from the reservoir or tank 4 down through the pipe or hose 6, through the hose 7 and into the rear end of the cylinder 38. The piston 37 will then be forced forwardly moving the piston rod 36 forwardly and swinging the arm 35 in a forward direction, thereby rotating the shaft or axle 28 and moving the forward furrow wheel down into engagement with the ground and thereby elevating the forward ends of the plow beams 11. As this movement takes place, the spring 26, which is of sufficient strength, will pull forwardly upon the arm 27, thereby rotating the land wheel supporting axle 12 and throwing the land wheel 15 into engagement with the ground raising the central portion or supporting the central portion of the beams 11. At the same time the link 24 will be pulled forwardly through the action of the arm 25 moving forwardly and this will cause the lever arm 22 to be moved forwardly at its lower end and swing the upper end of the lever arm rearwardly, pushing rearwardly upon the link 24 and forcing rearwardly upon the upper arm 17 throwing the rear trailer wheel into engagement with the ground and lifting the rear ends of the plow beams and moving the plows out of engagement with the ground.

From the foregoing description it can be seen that a very simple and efficient means has been produced for elevating the plows 10 out of engagement with the ground, this being possible at the will of the operator in order to lift the plows over an obstruction such as a rock or other obstruction which may be in the path of movement of the plow.

Through the medium of the present device the raising and lowering of the plows will be very flexible and under complete control of the operator, through the operation of the plow handle on the valve 5. It should be further understood that any suitable pressure may be employed for actuating the piston 37 without departing from the spirit of the invention, and it should be further understood that certain detail changes in mechanical construction may be employed, so long as these changes fall within the scope of the appended claims.

Having described the invention, what is claimed as new is:—

1. A device of the class described comprising a plow beam, a land wheel, a trailer wheel, a furrow wheel, means for supporting said wheels and adapted to be simultaneously operated for throwing said wheels into and out of engagement with the ground for raising and lowering said plow beam, a bracket supported upon said plow beam, a cylinder journaled upon said bracket, a piston slidably mounted in said cylinder, an arm connected to said piston and also connected with one of said axles for rotating one of said axles, and means for connecting the wheels for simultaneous movement into and out of engagement with the ground as said piston is moved within said cylinder.

2. A device of the class described comprising a plow beam, a land wheel supporting axle, a furrow wheel suporting axle, a trailer wheel supporting means, tension means connecting the furrow wheel supporting axle and the land wheel supporting axles for rotating the same simultaneously when one axle is rotated, wheels carried by said axles, a cylinder rockably mounted upon said plow beam, a piston slidably mounted within said cylinder, remote control means for actuating said piston in the cylinder, and a crank arm secured to one of said axles and engaging said piston for throwing the wheels into and out of engagement with the ground.

3. A device of the class described comprising an implement supporting beam, a plurality of wheels supporting said beam, means for interconnecting said wheels, a cylinder carried by said beam, a piston slidably mounted within said cylinder, means for actuating said piston within said cylinder, and means connecting said piston with one of said wheels for simultaneously throwing all of said wheels into and out of engagement with the ground.

4. A device of the class described comprising a beam, an implement supported by said beam, a plurality of wheels operably connected to said beam, a cylinder carried by said beam, means for connecting all of said wheels for simultaneously raising and lowering a piston operable within said cylinder, means connecting one of the wheels with said piston, whereby said wheels may be simultaneously raised and lowered into and out of engagement with the ground as said piston is operated, and means for controlling the operation of said piston within said cylinder.

EARLE F. CONLEY.